United States Patent [19]

Kobayashi

[11] Patent Number: 5,323,773
[45] Date of Patent: Jun. 28, 1994

[54] THROTTLE VALVE OF DIVING RESPIRATOR

[75] Inventor: Kazunori Kobayashi, Tokyo, Japan

[73] Assignee: Grand Bleu International, Inc., New York, N.Y.

[21] Appl. No.: 940,300

[22] Filed: Sep. 3, 1992

[30] Foreign Application Priority Data

Jul. 2, 1992 [JP] Japan .................................. 4-197499

[51] Int. Cl.$^5$ ........................... A62B 9/02; F16K 47/08
[52] U.S. Cl. ........................... 128/205.24; 128/207.16; 137/512; 137/513.3
[58] Field of Search ............................ 137/512, 513.3; 128/204.25, 205.24, 207.16, 207.12

[56] References Cited

U.S. PATENT DOCUMENTS 4,044,791  8/1977  McKenzie .................... 137/513.3 X

FOREIGN PATENT DOCUMENTS

| 83403 | 7/1983 | European Pat. Off. ......... 137/513.3 |
| 2056461 | 5/1972 | Fed. Rep. of Germany ... 137/514.3 |
| 2416104 | 4/1974 | Fed. Rep. of Germany ... 137/513.3 |
| 562923 | 11/1923 | France ............................ 137/513.3 |
| 15944 | 2/1965 | Japan .............................. 137/513.3 |

*Primary Examiner*—Edgar S. Burr
*Assistant Examiner*—Eric P. Raciti
*Attorney, Agent, or Firm*—Darby & Darby

[57] ABSTRACT

A throttle valve of a diving respirator, wherein an orifice valve is inserted slidably in a hole of a cylindrical valve body, an orifice is formed in said valve body so as to communicate a gas outlet and a gas inlet formed on the valve body, and a gas passage is formed between the gas outlet and the gas inlet, which is opened only when a gas pressure in the gas inlet is elevated to a predetermined valve so that the orifice valve is moved relative to the valve body.

5 Claims, 2 Drawing Sheets

THROTTLE VALVE OF DIVING RESPIRATOR

BACKGROUND OF THE INVENTION

1. Field of the Invention

The present invention relates to an improvement in a throttle valve of a diving respirator.

2. Description of the Prior Art

FIG. 1 is a view explaining a respirable gas supply passage of a conventional diving respirator. Reference numeral 1 denotes a gas passage through which a respirable gas, such as oxygen reduced in pressure to a predetermined value is supplied, 2 is a first gas pressure detecting gauge for detecting a gas pressure in said gas passage 1, 3 is a first throttle valve having an orifice, 4 is a second gas pressure detecting gauge for detecting a gas pressure reduced by said first throttle valve 3, 5 is a second throttle valve having an orifice, and 6 is a mouth piece unit to which the respirable gas reduced in pressure by said second throttle valve 5 is supplied.

In such diving respirator, the degree of reduction in pressure of gas reduced by said first throttle valve 3 is indicated as a pressure difference between the first and second gas pressure detecting gauges 2 and 4 in the normal state. In case that the orifice of the first throttle valve 3 is clogged up, the second gas pressure detecting gauge 4 shows zero pressure. In case that the orifice of the second throttle valve 5 is clogged up, the first and second gas pressure detecting gauges 2 and 4 show the same pressure. Accordingly, a diver can recognize the fact from the indications of said two gauges 2 and 4.

FIG. 2 is a sectional view of the throttle valve 3 or 5 of the conventional diving respirator, wherein reference numeral 7 is a cylindrical valve body having a center hole, 8 is a gas outlet communicated to said center hole and opened at opposite portions of an outer peripheral surface of the valve body 7, 9 is a gas inlet communicated to said center hole and opened at one end surface of the valve body 7, 10 is a lid mounted to the other end surface of the valve body 7, 11 is an orifice valve inserted into said center hole of the valve body 7, 12 is an orifice passing through the center portion of said orifice valve 11 and communicated to said gas outlet 8 at one end thereof and gas inlet 9 at the other end thereof, 13 is a compression spring inserted between said lid 10 and orifice valve 11, 14 is an elastic film made of a rubber or the like fitted to the outer peripheral surface of said valve body 7 so as to close both ends of said gas outlet 8 of the valve body 7, and 15 and 16 are O rings for hermetically seal. Said elastic cover serves as a non-return valve.

In such conventional throttle valve 3 or 5, when gas is supplied to the gas inlet 9 of the valve body 7 from the gas passage 1, the gas is passed through said orifice 12 of the orifice valve 11 and reduced in pressure and exhausted to the outside through the gas outlet 8 and a gap formed between the outer peripheral surface of the valve body 7 and the elastic film 14 against the resilient force of the elastic film 14.

As stated above, in order to detect the clog of the throttle valve 3 or 5, it is necessary to watch always indications of said two gas pressure detecting gauges 2 and 4 of the conventional diving respirator. However, such watching is very difficult for the general diver and it is very dangerous if the diver continues the diving without knowing the clog of the throttle valve.

SUMMARY OF THE INVENTION

It is an object of the present invention to provide an improved throttle valve of a diving respirator solving the above-described problems.

The above-described object can be attained by a throttle valve of a diving respirator comprising a cylindrical valve body, a gas outlet and a gas inlet formed on said valve body, an orifice valve arranged slidably in said valve body, an orifice passing through said orifice valve so as to communicate said gas outlet and gas inlet, a gas passage formed between an outer surface of said orifice valve and an inner surface of said valve body, and means for opening said gas passage when said orifice valve is moved relative to said valve body.

The above and other objects as well as advantageous feature of the prevent invention will become apparent from the following description of the embodiment taken in conjunction with the accompanying drawings.

DESCRIPTION OF THE PREFERRED EMBODIMENT

Figure 1:
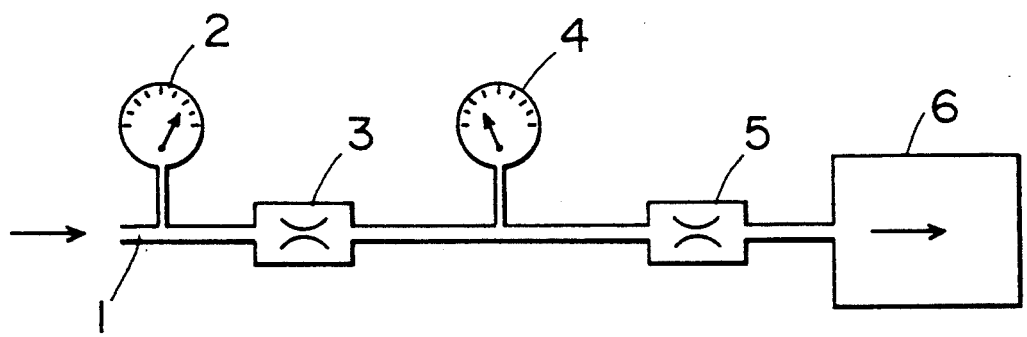
FIG. 1 an explanatory view of a respirable gas supply passage of a conventional diving respiration.
Figure 2:
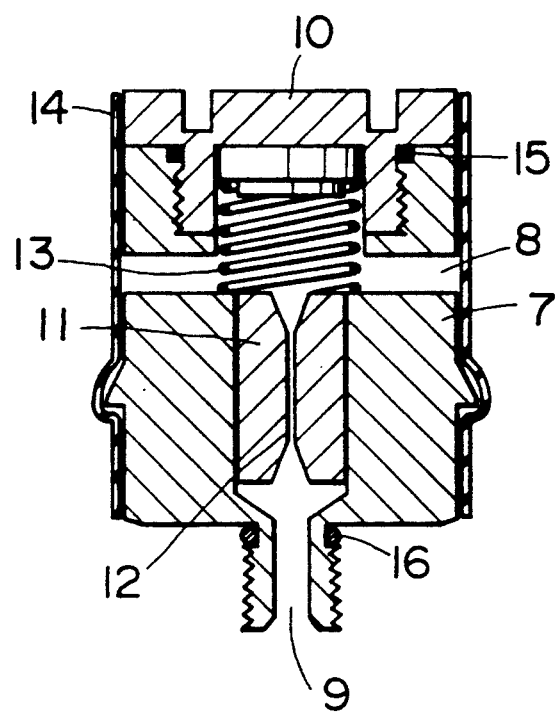
FIG. 2 is a sectional view of a throttle valve of the conventional diving respiration.
Figure 3:
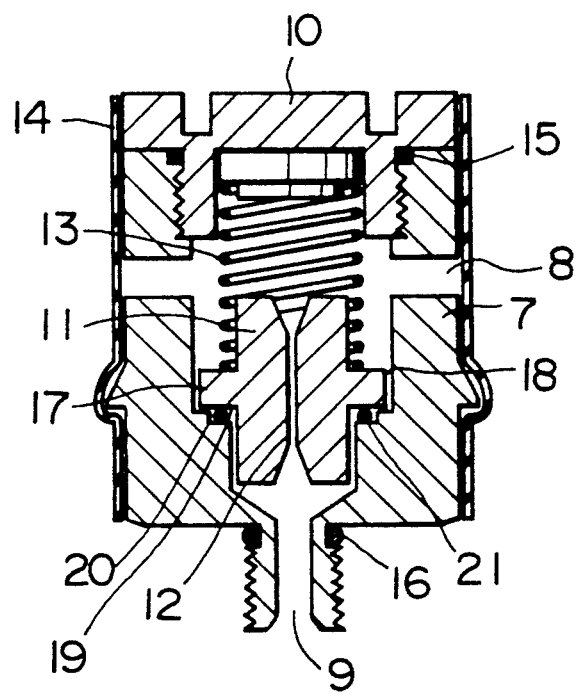
FIG. 3 is a sectional view of a throttle valve of the present invention.

As shown in FIG. 3, in the present invention, a flange 17 is provided on an outer peripheral surface of the orifice valve 11, and a gas passage 18 is formed between an outer peripheral surface of the flange 17 and an inner peripheral surface of the center hole of said valve body 7. A valve seat 19 is formed on a lower surface of said flange 17 and a valve seat 20 corresponding to said valve seat 19 is formed on the inner peripheral surface of said center hole at the gas inlet side. An O ring 21 for hermetic seal is inserted between both of said valve seats 19 and 20.

According to the throttle valve of the diving respirator of the present invention, the gas intruduced into the gas inlet 9 of the valve body 7 through the gas passage 1 is passed through the orifice 12 of the orifice valve 11, pushes up the elastic film 14 from the outer peripheral surface of the valve body 7 to form a gap therebetween, and is exhausted to the outside from the gas outlet 8 of the valve body 7 through said gap in the normal state. However, if the orifice 12 is clogged up, a gas pressure in the gas inlet 9 is elevated.

If the gas pressure in the gas inlet 9 is elevated, said orifice valve 11 is moved in the center hole of the valve body 7 against the spring action of the compression spring 13. As a result, a gap is formed between said valve seats 19 and 20, so that the gas flows through the gas passage 18 formed between the outer peripheral surface of the flange 17 of the orifice valve 11 and the inner peripheral surface of the center hole of the valve body 17 and reaches the gas outlet 8. Thus, the supply of gas is prevented from being stopped, even if the throttle valve is clogged up.

EFFECT OF THE INVENTION

As described above, according to the throttle valve of the present invention, the respirable gas can be supplied surely with safe to the diver even if the orifice valve is clogged up.

What is claimed is:

1. A diving respirator throttle valve comprising a cylindrical valve body, a gas outlet and a gas inlet formed on said valve body, an orifice valve slidably disposed in said valve body between a first position and a second position remote from said first position, an orifice passing through said orifice valve so as to communicate said gas outlet and gas inlet when said orifice valve is in said first position, a gas passage formed between an outer surface of said orifice valve and an inner surface of said valve body, said gas passage communicating said gas outlet and gas inlet at least when said orifice valve is in said second position and not communicating said gas outlet and gas inlet when said orifice valve is in said first position, means for resiliently biasing said orifice valve towards said first position, and means for opening said gas passage upon blockage of said orifice valve.

2. The throttle valve as claimed in claim 1, wherein said gas outlet is formed on an outer surface of said valve body, and said gas outlet is closed by an elastic film surrounding said outer surface of the valve body.

3. The throttle valve as claimed in claim 1, wherein a compression spring is provided for urging said orifice valve against a gas pressure in said gas inlet in the normal state, but allowing the movement of said orifice valve when the gas pressure is elevated due to the clog of said orifice.

4. A diving respirator throttle valve comprising:
a cylindrical valve body;
gas inlet means formed in said cylindrical valve body for providing gas communication from outside said cylindrical valve body to a first region inside said cylindrical valve body, said first region being at a first predetermined gas pressure when said diving respirator throttle valve is connected to a source of presurized gas;
gas outlet means formed in said cylindrical valve body for providing gas communication from a second region inside said cylindrical valve body to outside said cylindrical valve body, said second region being at a second predetermined gas pressure when said diving respirator throttle valve is connected to said source of presurized gas;
orifice valve means in said cylindrical valve body for providing a first gas communication passage between said first and second regions inside said cylindrical valve body when said orifice valve means is disposed in a first normal position; and
means for forming, in conjunction with said orifice valve means and cylindrical valve body, a second gas communication passage between said first and second regions inside said cylindrical valve body, in response to blockage of said first gas communication passage.

5. The diving respirator throttle valve of claim 4, wherein said means for forming, in conjunction with said orifice valve means and cylindrical valve body, a second gas communication passage between said first and second regions inside said cylindrical valve body, in response to closure of said first gas communication passage, includes means for maintaining said second region at said second predetermined gas pressure.

* * * * *